May 12, 1942.  G. E. BARNHART  2,282,447
THERMAL ENERGY INDICATING APPARATUS
Filed Jan. 19, 1940
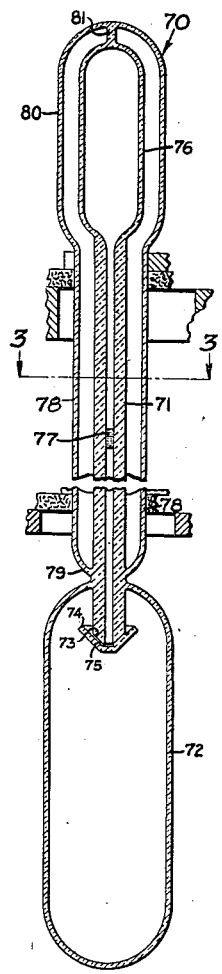
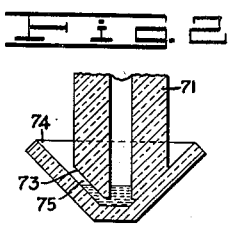
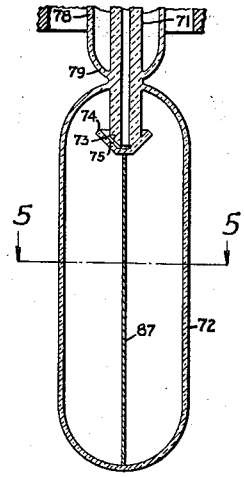
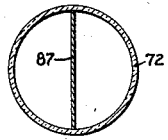
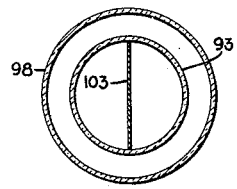
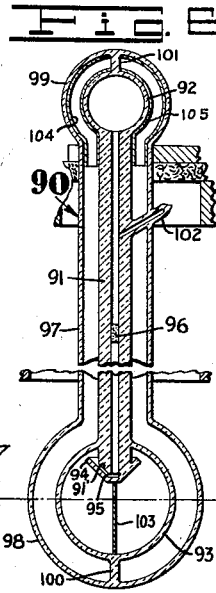
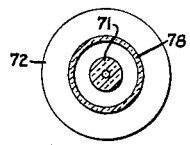
INVENTOR.
George E. Barnhart.
BY
ATTORNEY.

Patented May 12, 1942

2,282,447

UNITED STATES PATENT OFFICE 2,282,447

THERMAL ENERGY INDICATING APPARATUS

George E. Barnhart, Pasadena, Calif.

Application January 19, 1940, Serial No. 314,632

3 Claims. (Cl. 73—340)

This invention relates to indicating apparatus.

The general object of the invention is to provide a novel thermal energy indicating apparatus.

Another object of the invention is to provide a novel instrument adapted to indicate the effect of heat energy conducted thereto.

Another object of the invention is to provide a novel instrument adapted to indicate the effect of thermal radiation transferred thereto.

Other objects and the advantages of the invention will be apparent from the following description taken in connection with the accompanying drawing, wherein:

Fig. 1 is an enlarged fragmentary longitudinal section through the indicator instrument;

Fig. 2 is an enlarged detail section of a portion of the device shown in Fig. 1;

Fig. 3 is a section taken on line 3—3, Fig. 1;

Fig. 4 is a fragmentary view of the device shown in Fig. 1 with an additional element therein;

Fig. 5 is a section taken on line 5—5, Fig. 4;

Fig. 6 is an enlarged fragmentary longitudinal section through a modified form of the indicator; and Fig. 7 is a section taken on line 7—7, Fig. 6.

My thermal energy responsive indicating apparatus is indicated generally at 70. As shown the apparatus includes a transparent capillary tube 71 the lower end of which extends into an enlarged bulb 72. The lower end of the capillary tube 71 is bevelled as at 73 and has a tapered cup member 74 fused thereto at one point with the remainder of the cup spaced from the end of the capillary tube to provide a narrow passage 75 therebetween. (See Fig. 2.)

The upper portion of the capillary tube 71 is expanded to form an enlarged bulb portion 76 of less length and less diameter than the bulb 72. Positioned in the capillary tube 71 I provide a drop of opaque liquid 77 such as benzol. The bulbs 72 and 76 receive a gas such as nitrogen.

Surrounding the capillary tube 71 I provide an enlarged transparent tube 78 which at the lower end is contracted as at 79 and fused to the capillary tube adjacent the top of the bulb 72. The upper portion of the tube 78 is enlarged to form a bulb portion 80 surrounding the bulb 76. A spacing member 81 is secured between the bulbs 76 and 80 to prevent vibration of the capillary tube. The space between the capillary tube 71 and the tube 78 and the bulbs 76 and 80 is evacuated.

It will be seen that the relative sizes of the bulbs 72 and 76 may be optionally varied; under some conditions it will be preferable that the lower bulb be the smaller instead of the larger. Further, the lower bulb may be jacketed instead of the upper.

It will be seen that the apparatus described is a heat sensitive device. The indicating drop 77 being supported by the gas pressure within the lower bulb 72, the position of the drop will vary with the pressure difference between the lower bulb 72 and the upper bulb 76. As soon as any pressure difference is produced the drop 77 will move to restore equilibrium conditions. Further, the pressure difference depends upon the temperature difference of the gases within the bulbs 72 and 76. The bulb 76 when jacketed as shown is less responsive to outside temperature than the bulb 72. Heat conducted to the bulb 72 from the surrounding atmosphere is given to the gas through conduction and convection within the bulb causing an increase in pressure and a consequent movement of the drop 77. The heating effects due to radiation may be diminished by silvering the bulb 72.

It will be apparent that the device shown will be particularly sensitive to heat transferred to the gas in the bulb 72 by conduction, thermal radiation having only a small effect on the bulb.

In Figs. 4 and 5 I show the device 70 adapted to absorb the heat. To do this a blackened plate 87 may be positioned in the bulb 72. Under some conditions it is preferable to position the plate 87 in the upper bulb instead of the lower. Plates of color other than black may be used. Other means of transferring thermal radiation to the bulb to cause a change in the gas volume may be used.

In this type the indicator is sensitive to heat transferred to the gas within the bulb 72 by conduction and also by radiation. Thermal radiation to which the glass and gas would be relatively transparent, is absorbed by the black plate which then transfers the heat to the gas within the bulb 72.

In Fig. 6 I have indicated a modified form of thermal energy responsive indicating instrument at 90 which may be used in place of the device 70. As shown the device 90 includes a glass capillary tube 91 the upper portion of which is enlarged into a bulb portion 92. The lower portion of the capillary tube 91 extends into and is fused to an enlarged bulb member 93. The lower end of the capillary tube 91 is bevelled as at 91' and has a tapered glass cup member 94 fused thereto at one point in such a manner as to leave a small space 95 between the end of the tube and the cup. Within the capillary tube 91 I provide a drop of opaque liquid 96 such as benzol.

Surrounding the capillary tube 91 I provide an enlarged glass tube 97 the lower end of which enlarged into a bulb portion 98 spaced from and surrounding the bulb 93 and the upper end of which enlarged into a bulb portion 99 surrounding the bulb 92.

Connecting the bulb 93 and the bulb 98 I may provide a spacing member shown as a small glass post 100 which is fused to the bulbs and connecting the bulb 92 and the bulb 99 I provide a small glass post 101 which is fused to the bulbs.

Adjacent the upper end thereof the capillary tube 91 includes an angularly extending hollow neck portion 102 which extends through the side wall of the tube 97. The neck portion 102 enables a drop of liquid 96 such as benzol to be placed within the capillary tube. After the drop is inserted the neck is closed. The space between the capillary tube 91 and the tube 97 is evacuated. Within the bulb 93 I provide a black metal disk 103 for absorbing the heat. Under some conditions it is preferable to position the disk 103 in the small bulb instead of the larger.

This latter type is sensitive primarily to thermal radiation, conduction to the bulb 93 being minimized by the jacketing bulb 98. Relatively high frequency radiation passes through the relatively transparent jacketing bulb 98, the bulb 93, and the gas and is absorbed by the black plate 103 which then causes the gas within the bulb 93 to expand. Under some conditions it may be desirable to silver the inside of the bulb 99 as at 104 and to silver the outside of the bulb 92 as at 105.

From the foregoing description it will be apparent that I have invented a novel device which is highly efficient for its intended purpose.

Having thus described my invention, I claim:

1. In an instrument of the class described, a transparent capillary tube, a pair of spaced bulbs on said tube and communicating therewith, a receptacle member on one end of said tube within one of said bulbs, a transparent vacuum jacket surrounding said tube and one of said bulbs, an opaque liquid drop within said tube and a filling of gas within said bulbs.

2. In an instrument of the class described, a bulb having a transparent capillary tube extending therefrom and having a second bulb communicating with the capillary tube at the end of the latter remote from the first bulb, a drop of opaque liquid in said tube and a filling of gas in the tube and bulb at each side of the drop, and heat insulating means about said tube and one of said bulbs, the heat insulating means about said tube being transparent.

3. In an instrument of the class described, a transparent capillary tube, an upper bulb and a lower bulb on said tube and communicating therewith, a transparent vacuum jacket surrounding said tube and said bulbs, a heat absorbing plate positioned within said lower bulb, an opaque liquid drop within said tube, and a filling of gas within said bulbs.

GEORGE E. BARNHART.